United States Patent
Kato et al.

(10) Patent No.: US 10,793,194 B2
(45) Date of Patent: Oct. 6, 2020

(54) VEHICLE BODY FLOOR STRUCTURE

(71) Applicant: HONDA MOTOR CO., LTD., Tokyo (JP)

(72) Inventors: Koji Kato, Wako (JP); Takumi Muramatsu, Tochigi (JP)

(73) Assignee: HONDA MOTOR CO., LTD., Tokyo (JP)

( * ) Notice: Subject to any disclaimer, the term of this patent is extended or adjusted under 35 U.S.C. 154(b) by 18 days.

(21) Appl. No.: 16/214,278

(22) Filed: Dec. 10, 2018

(65) Prior Publication Data
US 2019/0185062 A1    Jun. 20, 2019

(30) Foreign Application Priority Data
Dec. 14, 2017 (JP) ................. 2017-239379

(51) Int. Cl.
*B62D 21/15* (2006.01)
*B62D 25/20* (2006.01)
*B62D 25/02* (2006.01)

(52) U.S. Cl.
CPC ......... *B62D 21/157* (2013.01); *B62D 25/025* (2013.01); *B62D 25/2036* (2013.01); *B62D 25/20* (2013.01)

(58) Field of Classification Search
CPC ............. B62D 25/20; B62D 25/0009; B62D 25/2036; B62D 21/15; B62D 21/157; B62D 25/025
USPC .................................... 296/204, 193.07, 209
See application file for complete search history.

(56) References Cited

U.S. PATENT DOCUMENTS

| 7,644,978 B2 * | 1/2010 | Tosaka ................. B62D 21/157 296/187.08 |
| 2010/0237659 A1 * | 9/2010 | Ishigame ............ B62D 21/157 296/204 |

FOREIGN PATENT DOCUMENTS

| JP | S62-177578 U | 11/1987 |
| JP | 2003-026049 A | 1/2003 |
| JP | 2004-322902 A | 11/2004 |
| JP | 2008-189137 A | 8/2008 |

OTHER PUBLICATIONS

Japanese Office Action with English translation dated Jul. 2, 2019 (8 pages).

* cited by examiner

*Primary Examiner* — Dennis H Pedder
(74) *Attorney, Agent, or Firm* — Rankin, Hill & Clark LLP (57) ABSTRACT

A vehicle body floor structure has: a floor panel having a side edge; a side sill joined to the side edge of the floor panel; a cross member connected to the side sill, the cross member extending in a direction that crosses a direction in which the side sill extends; a first reinforcing member disposed at an internal corner defined by the side sill and the cross member, the first reinforcing member joined to the side sill and to a joint portion of the cross member; and a second reinforcing member disposed at the joint portion of the cross member. The first reinforcing member has an end portion located on a side of the joint portion and having a weak portion.

11 Claims, 8 Drawing Sheets

VEHICLE BODY FLOOR STRUCTURE

CROSS-REFERENCE TO RELATED APPLICATIONS

The present application claims priority under 35 U.S.C. § 119 to Japanese Patent Application No. 2017-239379, filed Dec. 14, 2017, the contents of which are hereby incorporated by reference in their entirety.

BACKGROUND OF THE INVENTION

1. Field of the Invention

The present invention relates to a vehicle body floor structure.

2. Description of Related Art

There is known a conventional vehicle body floor structure having a front cross member, a front side rail located on the front side of the front cross member, and a frame side reinforcement disposed on the front side rail. This conventional vehicle body floor structure is described in Japanese Patent Application Public Disclosure No. 2004-322902. In this vehicle body structure, a bulkhead is disposed in the front cross member at a location such that the bulkhead opposes the frame side reinforcement. The floor structure further has a rear cross member and an inner side reinforcement located between the front cross member and the rear cross member and extending continuously from the bulkhead.

When an offset collision load is inputted from the front side of the vehicle body, a load F divided from that load is inputted from the frame side reinforcement to the bulkhead, and transmitted via the inner side reinforcement to the rear cross member. As a result, the offset collision load can be distributed to be received by the entire underbody.

SUMMARY OF THE INVENTION

Problem to be Solved by Invention

To secure high load-bearing capacity against a collision to a side surface (hereinafter referred to as side collision) for such a conventional vehicle floor structure, there is demand for further improvement in addition to disposing a reinforcing member between a cross member and a side sill.

It is an object of the present invention to provide a vehicle body floor structure that is capable of reliably receiving and distributing a load inputted to a side sill by a side collision.

Solution to Problem

The present invention provides a vehicle body floor structure having: a floor panel having a side edge; a side sill joined to the side edge of the floor panel; a cross member connected to the side sill, the cross member extending in a direction that crosses a direction in which the side sill extends; a first reinforcing member disposed at an internal corner defined by the side sill and the cross member, the first reinforcing member joined to the side sill and to a joint portion of the cross member; and a second reinforcing member disposed at the joint portion of the cross member. The first reinforcing member has an end portion located on a side of the joint portion and having a weak portion.

Advantageous Effect of the Invention

The present invention provides a vehicle body floor structure that is capable of reliably receiving and distributing a load inputted by a side collision.

DETAILED DESCRIPTION OF EMBODIMENTS

Hereinafter, a description will be given of an embodiment of the present invention with reference to the drawings as appropriate. The same reference signs denote the same constituent elements throughout the drawings, and duplicative descriptions will be omitted. When a direction is referred to, unless otherwise described, it will be based on front, rear, left, right, up and down directions as viewed from a driver. It should be noted that "vehicle width direction" is synonymous with "left-right direction".

Figure 1:
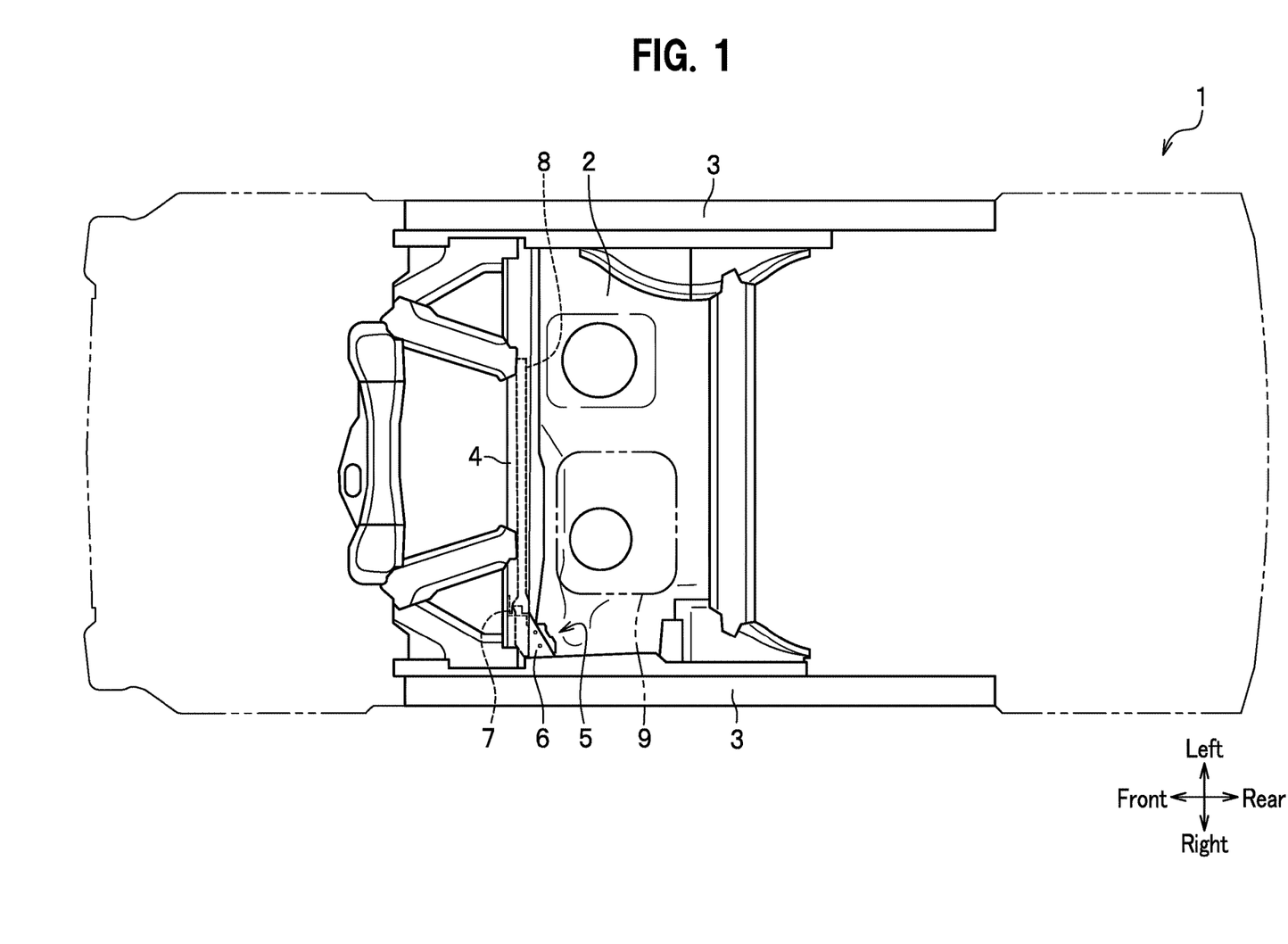
FIG. 1 is a bottom view of a vehicle body, showing a vehicle body floor structure according to an embodiment of the present invention.

As shown in FIG. 1, in the vehicle body floor structure of the present embodiment, a floor panel 2 and a left-right pair of side sills 3 joined to side edges of the floor panel 2 are disposed on a vehicle body 1.

A cross member 4 is connected between the side sills 3. The cross member 4 is disposed to extend longitudinally in a vehicle width direction that crosses the side sills 3, which are disposed to extend in a vehicle front-rear direction. The cross member 4 has left and right end portions respectively connected to the left and right side sills 3.

The vehicle body 1 of the present embodiment is provided with, on an underside of the floor panel 2, a gusset 6, which serves as a first reinforcing member described later, at an internal corner 5 where the right side sill 3 and the cross member 4 are connected to each other. A fuel tank 9 is disposed on the underside of the floor panel 2.

The cross member 4 is provided with a bulkhead 7, serving as a second reinforcing member, and a stiffener 8, serving as a third reinforcing member, inside the cross member 4.

Figure 2:
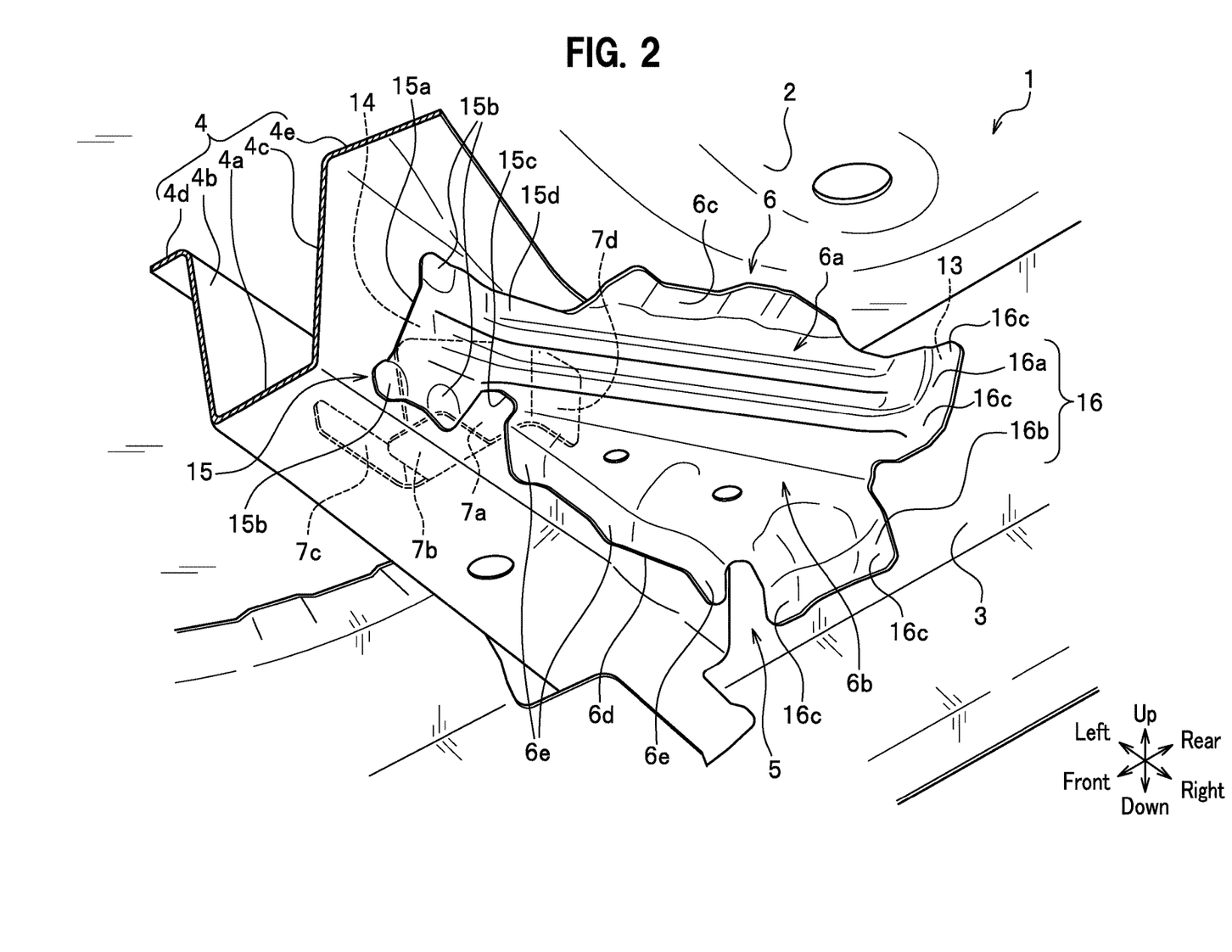
FIG. 2 is a perspective view showing main components of the vehicle body floor structure, wherein the vehicle body floor structure is seen obliquely from below.

As shown in FIG. 2, the cross member 4 includes: a bottom wall portion 4a located in parallel with the floor panel 2 with a predetermined space therebetween, the bottom wall portion 4a having a front side edge located on the front side in the vehicle front-rear direction and a rear side edge located on the rear side in the vehicle front-rear direction; a front wall portion 4b formed integrally with the bottom wall portion 4a to extend from the front side edge of the bottom wall portion 4a at a substantially right angle thereto; and a rear wall portion 4c formed integrally with the bottom wall portion 4a to extend from the rear side edge of the bottom wall portion 4a at a substantially right angle thereto, on the opposite side of the front wall portion 4b.

The front wall portion 4b of the cross member 4 includes an integrally formed front flange portion 4d joined to the lower surface of the floor panel 2. The rear wall portion 4c of the cross member 4 includes an integrally formed rear flange portion 4e joined to the lower surface of the floor panel 2. With this structure, the cross member 4 has a substantially hat shape in a cross section taken along the vehicle front-rear direction.

It should be noted, in FIG. 2, illustration of the stiffener 8 disposed in the cross member 4 is omitted.

Gusset

A description will be given of the gusset 6 of the vehicle body floor structure of the vehicle body 1 according to the present embodiment with reference to FIGS. 3 to 7.

The gusset 6 includes: a flat plate-like, oblique wall portion 6a (see FIG. 2) formed to bridge between the right side sill 3 and the cross member 4 and to define an oblique angles to them; and a left end portion 15 and a right end portion 16 respectively formed integrally with left and right ends of the oblique wall portion 6a. The right end portion 16 of the gusset 6 corresponds to a right end thereof in the vehicle width direction and is joined to a sill-side joint portion 13 of the right side sill 3. The left end portion 15 of the gusset 6 corresponds to a left end thereof in the vehicle width direction and is joined to a joint portion 14 provided on the rear wall portion 4c of the cross member 4.

Figure 3:
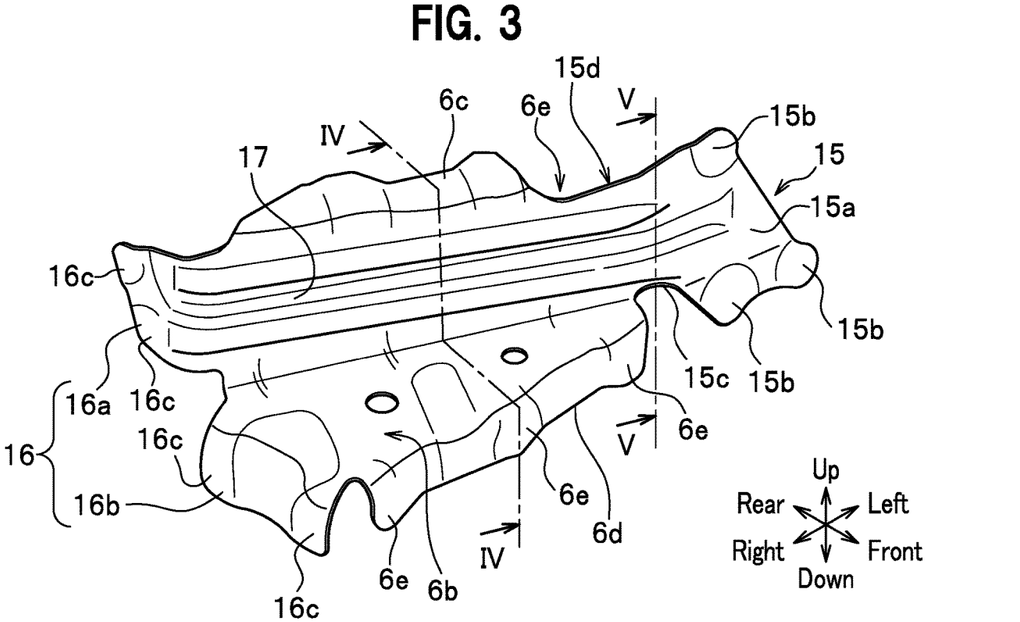
FIG. 3 is a perspective view of a first reinforcing member used in the vehicle body floor structure.

The gusset 6 includes an integrally formed lower wall portion 6b having a substantially triangular shape in plan view and defining a right angle to a side edge portion of the oblique wall portion 6a, to define a lower surface substantially in parallel with the floor panel 2. The gusset 6 includes an upper flange portion 6c joined to the lower surface of the floor panel 2, on a side edge portion of the oblique wall portion 6a located on the opposite side of the lower wall portion 6b.

The left end portion 15 located on the left side of the gusset 6 in the vehicle width direction has a joint surface 15a that integrally extends from the oblique wall portion 6a and faces the joint portion 14 of the cross member 4. The joint surface 15a has three joint points 15b.

The joint surface 15a is made to abut the joint portion 14 of the rear wall portion 4c of the cross member 4 in the vehicle front-rear direction and joined to the joint portion 14 via the joint points 15b.

The lower wall portion 6b has a lower joint flange 6d formed integrally with the lower wall portion 6b along a front side edge thereof and facing the rear wall portion 4c of the cross member 4. The lower joint flange 6d has three joint points 6e, which are joined to the rear wall portion 4c of the cross member 4 from the rear side of the vehicle.

As shown in FIG. 3, on the side of the joint surface 15a of the left end portion 15, the oblique wall portion 6a has a notch 15c which is formed in a V-shape in a lower edge of the oblique wall portion 6a to serve as a weak portion.

The notch 15c defines a narrow portion 15d between the oblique wall portion 6a and the left end portion 15. The narrow portion 15d has an up-down direction dimension smaller than that of other portion of the oblique wall portion 6a.

Figure 6:
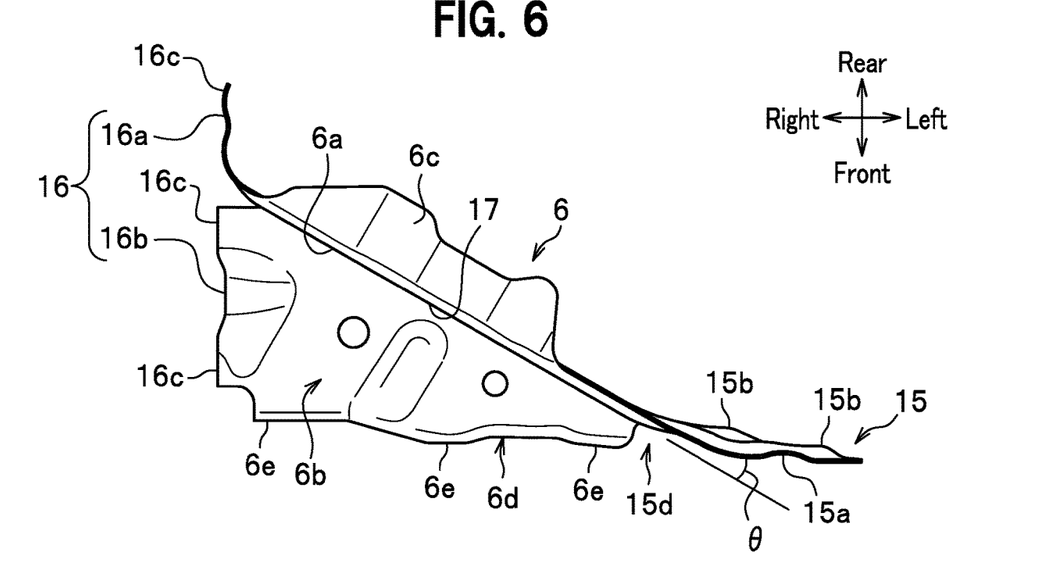
FIG. 6 is a top view showing the configuration of the first reinforcing member.
Figure 7:
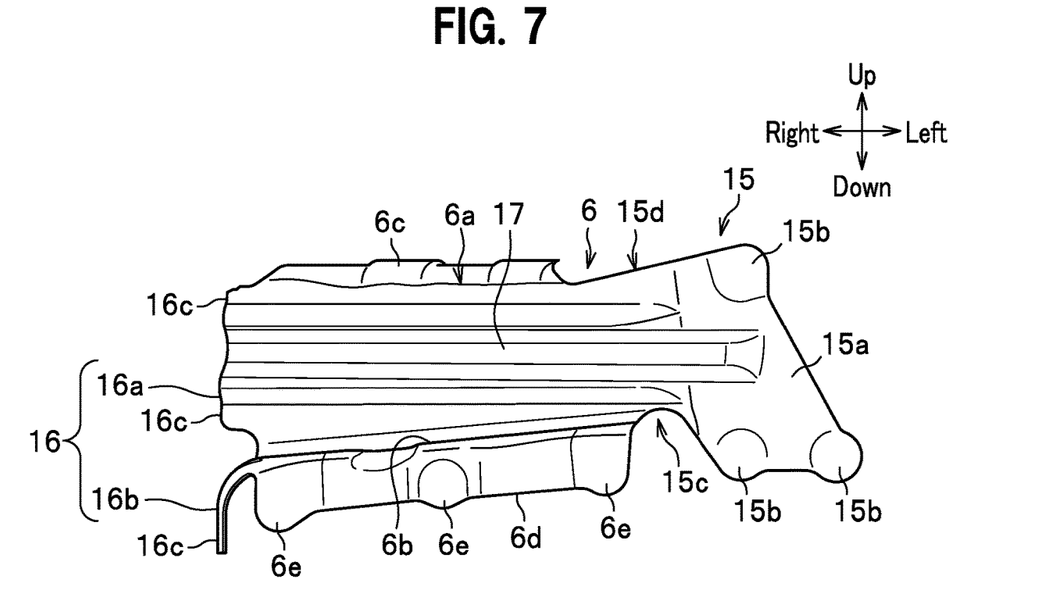
FIG. 7 is a front view showing the configuration of the first reinforcing member.

As shown in FIG. 6, the narrow portion 15d of the present embodiment is bent so that a predetermined angle θ is defined between a plane defined by the oblique wall portion 6a and a plane of the left end portion 15.

Figure 4:
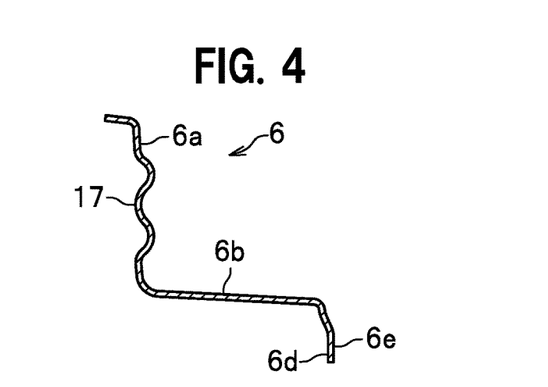
FIG. 4 is an end view taken along line IV-IV in FIG. 3.
Figure 5:
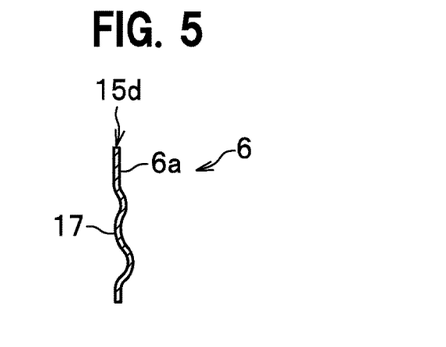
FIG. 5 is an end view taken along line V-V in FIG. 3.

As understood from a comparison of FIGS. 4 and 5, the lower wall portion 6b, which defines a right angle to the oblique wall portion 6a, does not exist in the region where the narrow portion 15d is formed. The narrow portion 15d has a plate-like shape whose normal direction is substantially coincident with the vehicle front-rear direction. The joint surface 15a of the left end portion 15 extends continuously from the oblique wall portion 6a via the narrow portion 15d.

The oblique wall portion 6a has a bead 17 formed thereon extending in the vehicle width direction.

As shown in FIG. 4, the bead 17 according to the present embodiment has a wave-like cross section in the oblique wall portion 6a. The bead 17 extends linearly between the left end portion 15 and the right end portion 16 of the oblique wall portion 6a. As shown in FIG. 3, the bead 17 extends further than the notch 15c inward in the vehicle width direction on the side of the left end portion 15 (see FIG. 5).

The gusset 6 has joint flanges 16a and 16b that face the sill-side joint portion 13 of the right side sill 3, in the right end portion 16 located on the right side of the gusset 6 in the vehicle width direction. The joint flange 16a integrally extends from aside end of the right end portion 16, which is located on the right end of the oblique wall portion 6a in the vehicle width direction. The joint flange 16b integrally extends from a right end portion of the lower wall portion 6b located on the right end edge in the vehicle width direction.

Each of the joint flanges 16a and 16b has two joint points 16c.

As shown in FIG. 2, the joint points 16c are made to abut the sill-side joint portion 13 located on an inner surface of the right side sill 3 in a vehicle in-out direction, to be joined to the sill-side joint portion 13.

Bulkhead

As shown in FIG. 2, the bulkhead 7 serving as the second reinforcing member is attached to the joint portion 14 of the cross member 4. The bulkhead 7 is located inside the cross member 4 and apart from the right side sill 3 (see FIG. 10), at a location that corresponds to a portion of the cross member 4 to which the joint surface 15a formed in the left end portion 15 of the gusset 6 is joined.

The bulkhead 7 includes: a partition wall portion 7a with a flat-plate like partition wall defining a right angle to the longitudinal direction of the cross member 4; a bottom side joint flange portion 7b formed integrally with the partition wall portion 7a and facing and joined to an inner surface of the bottom wall portion 4a; a front side joint flange portion 7c formed integrally with the partition wall portion 7a and facing and joined to an inner surface of the front wall portion 4b of the cross member 4; and a rear side joint flange portion 7d formed integrally with the partition wall portion 7a and facing and joined to an inner surface of the rear wall portion 4c of the cross member 4.

The bulkhead 7 is disposed to partition the inner space of the cross member 4 into spaces located side by side in the vehicle width direction, so that the cross member 4 has desired rigidity against a load inputted in the vehicle front-rear direction.

Figure 8:
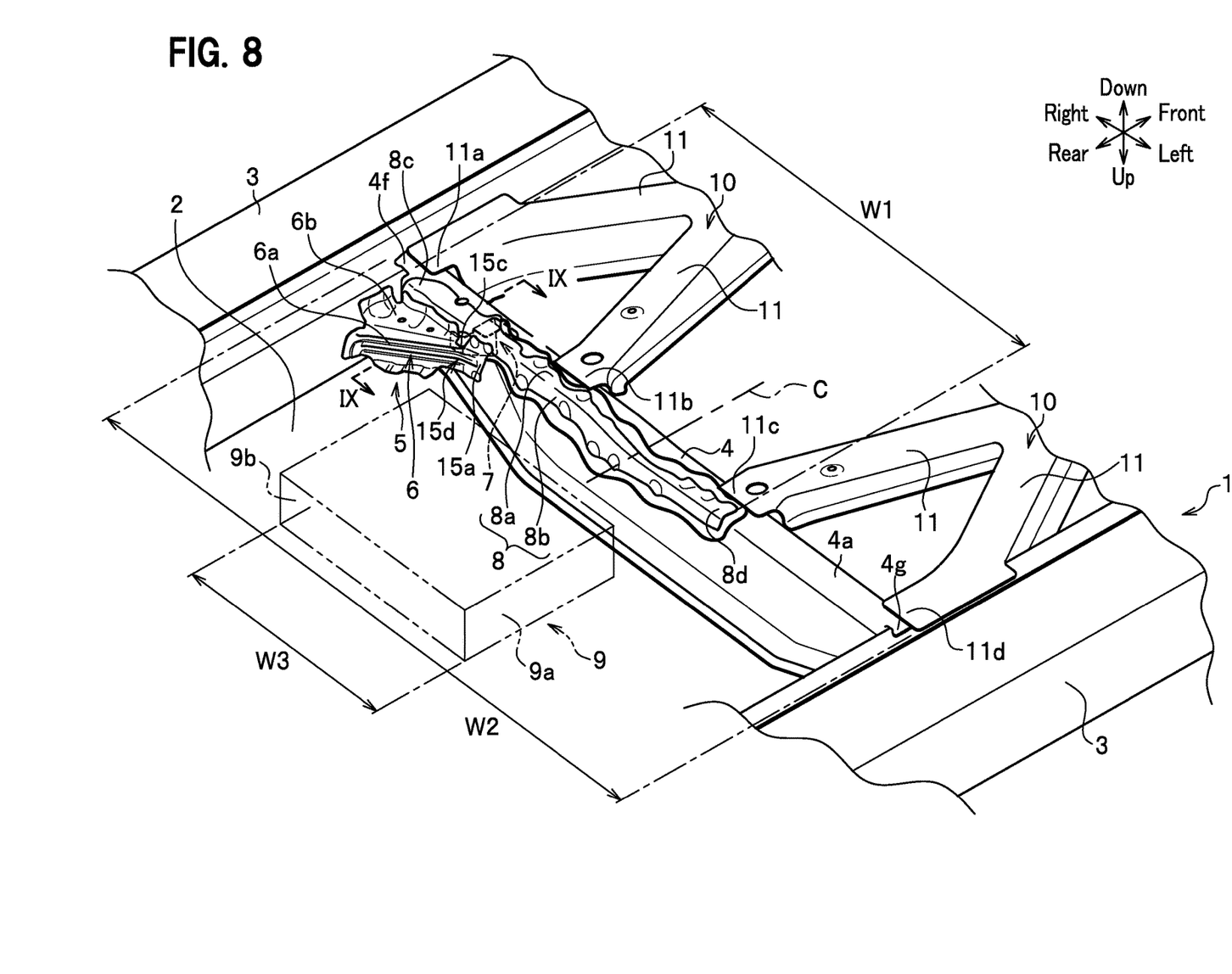
FIG. 8 is a perspective view showing positional relationship between a fuel tank located on the underside of the vehicle body and the third reinforcing member, wherein a cross member is transparently illustrated.

As shown in FIG. 8, the fuel tank 9 is disposed on the underside of the floor panel 2 of the vehicle body 1. The fuel tank 9 is fixed on the rear side of the cross member 4 in the vehicle front-rear direction and close to the right side sill 3, to which the gusset 6 is attached, in the vehicle width direction.

A V-shaped, left and right pair of front side frames 10 that extends from the front side of the vehicle is provided on the floor panel 2 of the present embodiment, on a side opposite the fuel tank 9 relative to the cross member 4. Each of the front side frames 10 bifurcates into two support bridge portions 11. The support bridge portions 11 have rear end portions 11a to 11d connected to the front wall portion 4b of the cross member 4. The rear end portions 11a to 11d are configured so that portions of the cross member 4 to which the rear end portions 11a to 11d are connected are spaced apart from one another at a distance equal to or larger than a predetermined distance in the vehicle width direction.

Stiffener

As shown in FIG. 8, the stiffener 8 having a longitudinal length in the vehicle width direction and serving as the third reinforcing member is disposed inside the cross member 4 of the present embodiment.

Figure 9:
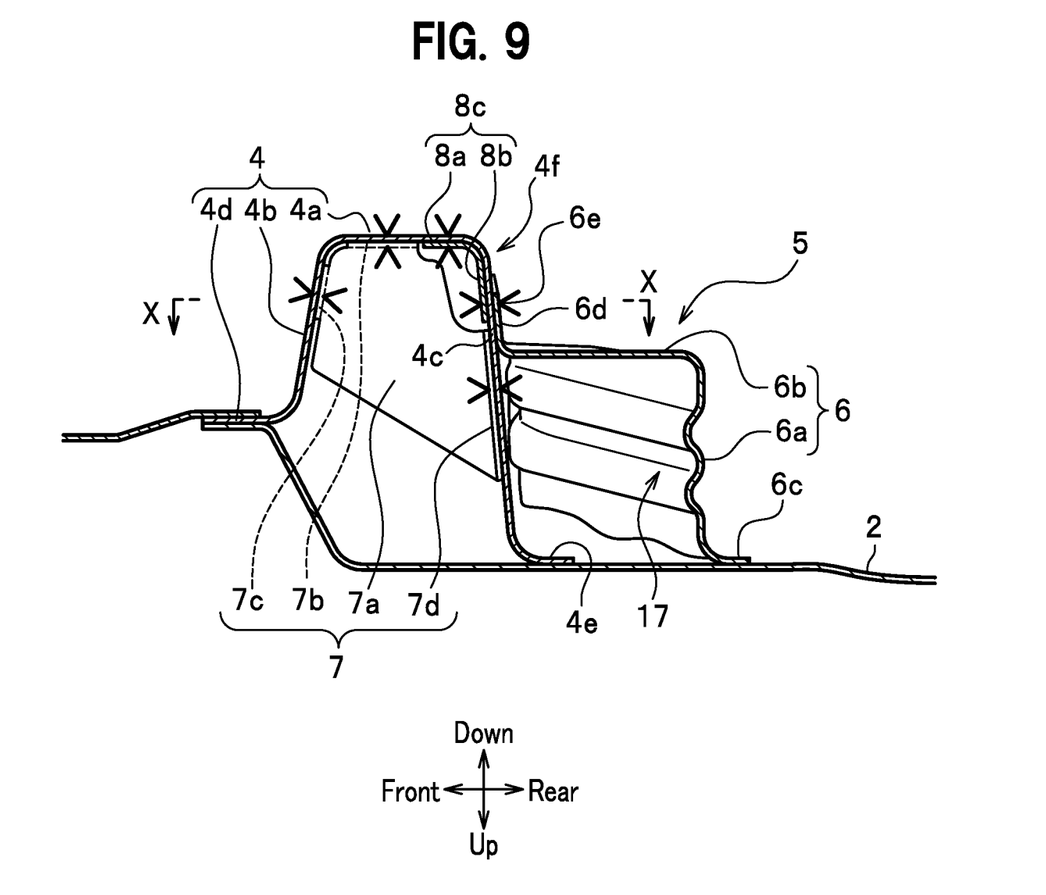
FIG. 9 is a cross-sectional view of the vehicle body floor structure, taken along line IX-IX in FIG. 8.

The stiffener 8 has a lower surface portion 8a and a rear side surface portion 8b such that the stiffener 8 has a substantially L-shaped vertical cross section (see FIG. 9).

The stiffener 8 is disposed to extend along the cross member 4 in the longitudinal direction thereof from one end portion 4f (right end portion) of the cross member 4 located on the side of the fuel tank 9 toward the other end portion 4g (left end portion) of the cross member 4.

Figure 10:
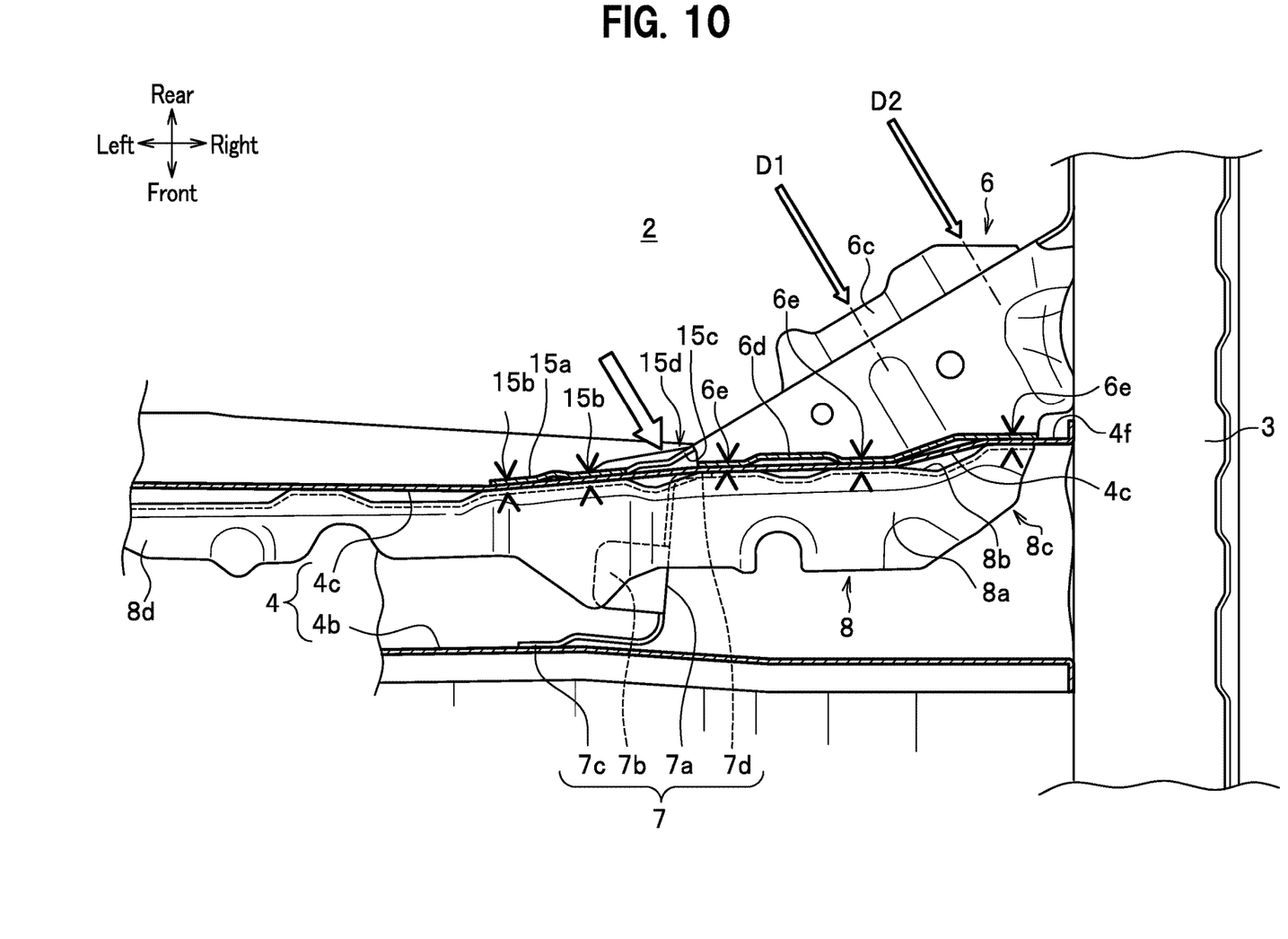
FIG. 10 is a cross-sectional view of the vehicle body floor structure, taken along line X-X in FIG. 9.

FIG. 10 shows a cross section taken along line X-X in FIG. 9. It should be noted that, for ease of understanding, the stiffener 8 is illustrated so that the lower surface portion 8a thereof is seen from below.

The stiffener 8 of the present embodiment has one end portion 8c located on an inner side of the one end portion 4f of the cross member 4. The side surface portion 8b of the stiffener 8, the rear wall portion 4c of the cross member 4, and the lower joint flange 6d of the gusset 6 are joined together in an overlapping manner, at at least one joint point 6e of the lower joint flange 6d corresponding to the one end portion 8c, with the rear wall portion 4c interposed between the side surface portion 8b and the lower joint flange 6d.

Further, in the present embodiment, at lower two of the joint points 15b of the joint surface 15a of the gusset 6, the rear side surface portion 8b of the stiffener 8, the rear wall portion 4c of the cross member 4, and the joint surface 15a are joined together in an overlapping manner, with the rear wall portion 4c interposed between the side surface portion 8b and the joint surface 15a.

As shown in FIG. 8, the other end portion 8d of the stiffener 8 is disposed inside the cross member 4 and extends past the center C of the cross member 4 in the vehicle width direction toward the other end portion 4g of the cross member 4.

In the present embodiment, the other end portion 8d extends to a portion of the cross member 4 to which the rear end portion 11c of the support bridge portion 11 of the left front side frame 10 is connected.

As shown in FIG. 9, the stiffener 8 is joined to the bottom wall portion 4a and rear wall portion 4c of the cross member 4 via a plurality of joint points arranged across the entire length of the stiffener 8.

As shown in FIG. 8, the stiffener 8 has a length W1 in the vehicle width direction smaller than a length W2 from the one end portion 4f of the cross member 4 to the other end portion 4g thereof (i.e., W1<W2).

The vehicle width direction length W1 of the stiffener 8 is larger than a length W3 from a left side surface 9a of the fuel tank 9 to a right side surface 9b thereof (i.e., W3<W1).

In plan view, the stiffener 8 overlaps the fuel tank 9 so that the extent of the fuel tank 9 from the left side surface 9a to the right side surface 9b falls within the length of the stiffener 8 in the vehicle width direction and so that the stiffener 8 partially overlaps the fuel tank 9 in the vehicle front-rear direction.

Next, a description will be given of the effects of the vehicle body floor structure of the vehicle body 1 according to the present embodiment, with reference to FIG. 11.

Figure 11:
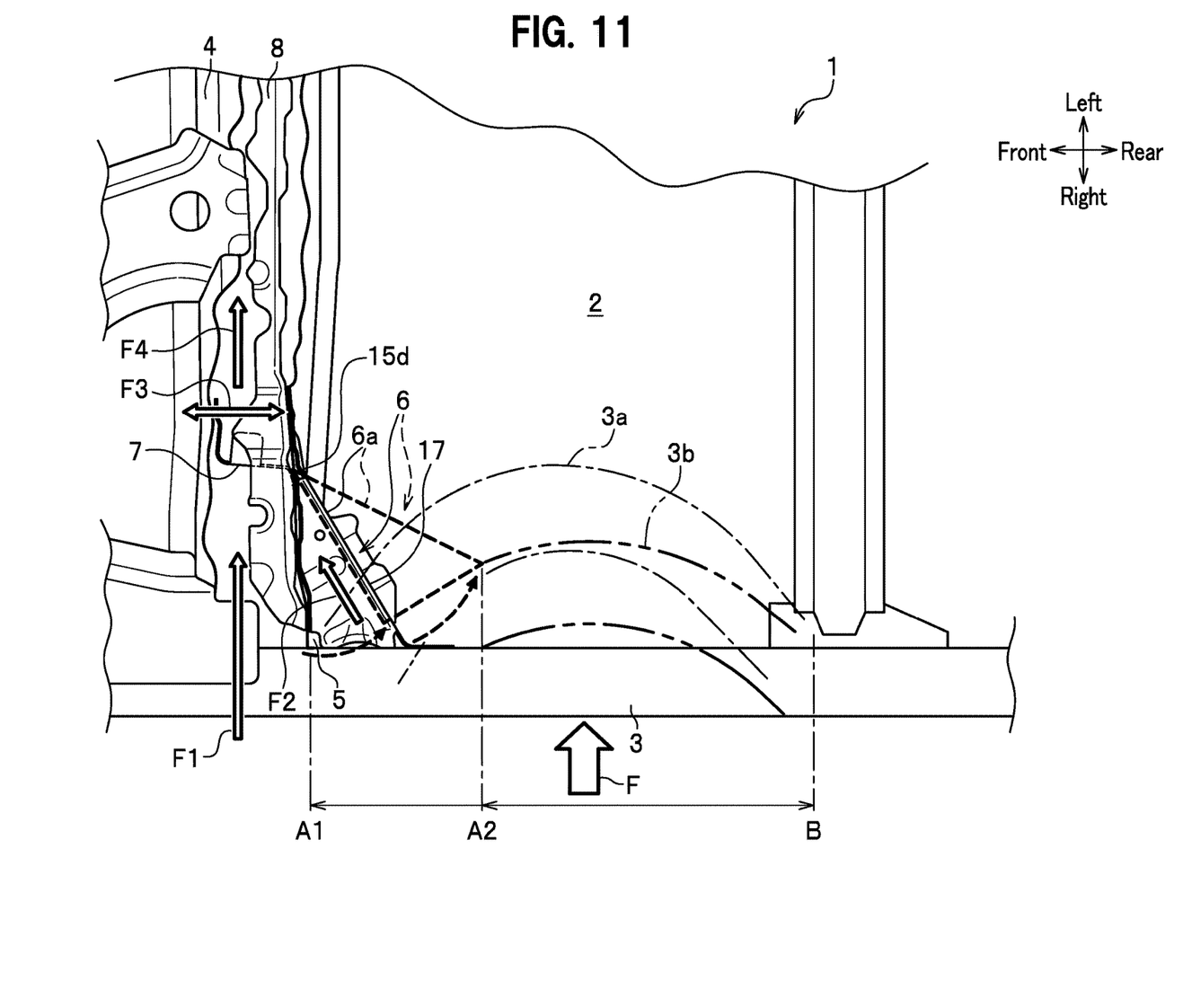
FIG. 11 is a schematic diagram illustrating forces caused by a load inputted in the event of a side collision to the vehicle body floor structure, wherein substantial parts are seen from below.

As shown in FIG. 11, a side collision to the right side of the vehicle body 1 of the present embodiment causes an load to be inputted and transmitted to a portion of the right side sill 3 to which the cross member 4 is connected. The load is then transmitted as a load F1 applied along the direction in which the cross member 4 extends.

When a load F is inputted due to a side collision to a portion of the right side sill 3 located rearward of a portion of the right side sill 3 to which the cross member 4 is connected, a load F2 is transmitted to the cross member 4 via the gusset 6, from the joint surface 15a of the left end portion 15 of the gusset 6.

The gusset 6 is deformed to be bent at the V-shape notched narrow portion 15d. As the high-rigid bulkhead 7 is disposed in the cross member 4 at the location where the narrow portion 15d is located, it is unlikely that the cross member 4 collapses in such a manner that a cross section of the cross member 4 taken in the vehicle front-rear direction collapses due to the load F3 applied in the vehicle front-rear direction.

Moreover, in the present embodiment, as shown in FIG. 6, a predetermined angle θ is defined between a plane of the oblique wall portion 6a and a plane of the left end portion 15 at the narrow portion 15d. For this reason, the narrow portion 15d is likely to be a place from where the bend deformation starts.

For example, if a gusset in which the notch 15c is not formed and the load F2 is applied to the gusset, deformation of the gusset may possibly start from unexpected portions having relatively weak strength in terms of the structure, for example from the portions indicated by D1 and D2 in FIG. 10. In this case, the load F2 is not transmitted to the cross member 4 and to the bulkhead 7 in a desired manner.

As a gusset with such a structure fails to distribute the load, when a load F is inputted to the right side sill 3 in the event of a side collision as shown in FIG. 11, it is possible that the right side sill 3 becomes largely deformed inward in the vehicle width direction to a position indicated by the alternate long and short dash lines 3a in FIG. 11.

In contrast, the gusset 6 of the vehicle floor structure according to the present embodiment will be reliably deformed to be bent at the narrow portion 15d, which corresponds to the bulkhead 7. Therefore, the gusset 6 is able to, while absorbing the load F2 applied in a compression direction, transmit the load F2 to the cross member 4.

The load F2 inputted by the side collision is divided into the load F3, which compresses the bulkhead 7 in the vehicle front-rear direction, and into a load F4, which is applied to the cross member 4 in the direction in which the cross member 4 extends. Therefore, the vehicle body floor structure of the present embodiment provides high load-bearing capacity against the load inputted by a side collision.

Comparison with Comparative Example

The alternate long and short dash lines in FIG. 11 illustrates, as a comparative example, a result of a side collision to a vehicle body in which the gusset 6, the bulkhead 7, and the stiffener 8 are not provided. When a load F is inputted to a right side sill 3 by the side collision, the right side sill 3 is likely to get inside in the vehicle width direction, for example, to a position indicated by the alternate long and short dash lines 3a between A1 and B in FIG. 11.

The alternate long and two short dashes lines in FIG. 11 illustrate a result of a side collision to the vehicle body 1 of the embodiment. The vehicle body 1 of the embodiment is provided with the gusset 6 disposed at the internal corner 5. The gusset 6 has a V-shaped notch 15c at a location corresponding to the bulkhead 7. That means, a weak portion defined by the narrow portion 15d is able to be formed at an intended location.

When a load F is inputted to the right side sill 3 as indicated by the dashed lines shown in FIG. 11, the gusset 6 rotates in the counterclockwise direction on the drawing plane (clockwise direction as seen from above the vehicle) about the narrow portion 15d.

The oblique wall portion 6a of the gusset 6 with the substantially triangular shape in plan view has rigidity increased by the bead 17. For this reason, the gusset 6 rotates with keeping a predetermined shape while being deformed in the compression direction, and remains on the rear side of the rear wall portion 4c of the cross member 4.

When the gusset 6 is deformed and displaced as shown in the region from A1 to A2 of FIG. 11, the length of a portion from A2 to B of the side sill 3 that can be deformed toward inside of the vehicle as illustrated by the alternate long and two short dashes lines becomes short. As a result, the side collision energy is distributed in such a way that the energy absorbed by the side sill 3b is reduced and instead the energy absorbed by the cross member 4 is increased.

Moreover, the right side sill 3 is inhibited from being deformed toward inside of the vehicle, on the underside of the floor panel 2. That means, the structure allows for disposing the fuel tank 9 close to the right side sill 3 to which the gusset 6 is attached, as shown in FIG. 8. Therefore, the structure increases the degree of freedom in arranging the fuel tank 9 on the underside of the floor panel 2.

As has been described, the vehicle body floor structure of the vehicle body 1 of the embodiment is able to receive a load inputted to the right side sill 3 by a side collision in such a way that the load is reliably distributed to the vehicle body 1.

As shown in FIG. 11, the weak notch 15c is formed in the gusset 6 so that the gusset 6 includes the weak narrow portion 15d in its left end portion 15 located on the joint portion 14 side of the rear wall portion 4c of the cross member 4. This structure allows the narrow portion 15d to be bent at an intended portion thereof to transmit the load F3 to the bulkhead 7 in a direction in which the bulkhead 7 is compressed. Thus, the structure allows for distributing the load inputted by the side collision to the bulkhead 7 and the cross member 4 so that a high load is transmitted to the bulkhead 7, securing high load-bearing capacity against the load inputted by the side collision.

As shown in FIG. 11, the bulkhead 7 provides high rigidity against the load F3 applied in the vehicle front-rear direction, in the cross member 4. This enables the structure to reliably distribute and receive the load inputted.

The gusset 6 is deformed to be bent from the V-shaped notch 15c located at the joint portion 14, to transmit the inputted load F2 to the bulkhead 7 in the cross member 4.

This enables the structure to further reliably distribute the load inputted, to receive the load by the entire vehicle body 1.

Moreover, as shown in FIG. 9, the bead 17 formed on the gusset 6 extends past the notch 15c toward the center C of the cross member 4 in the vehicle width direction to inhibit the gusset 6 from being deformed. Thus, the load applied to the cross member 4 toward the center C in the vehicle width direction can be controlled so that the load is properly transmitted to the cross member 4. This makes it possible to distribute the load inputted by a side collision over the entire vehicle body 1.

The stiffener 8, the other end portion 8d of which extends past the center C in the vehicle width direction, reinforces the cross member 4 in such a way as to cover the entire width W3 of the fuel tank 9 in the vehicle width direction in plan view. The stiffener 8 is attached to the cross member 4 from the inside thereof and can sufficiently receive a load inputted to the cross member 4. Thus, the fuel tank 9 is protected from influences of the deformation or the like due to the load inputted.

In addition, the length of the stiffener 8 from the one end portion 8c to the other end portion 8d is smaller than the length of the cross member 4 from the one end portion 4f to the other end portion 4g. With this configuration, compared with a vehicle body floor structure such that a stiffener is disposed to extend over the whole width dimension W2 of the cross member 4, the floor structure of the embodiment requires less amount of material and thus is reduced in weight.

As shown in FIG. 8, the other end portion 8d of the stiffener 8 extends past the center C of the cross member 4 in the vehicle width direction toward the other end portion 4g on the other side of the center C, to a portion of the cross member 4 to which the rear end portion 11c of the support bridge portion 11 of the left front side frame 10 located on the front side is connected. With this configuration, the stiffener 8 receives a load transmitted from the support bridge portion 11 of the left front side frame 10, so that the fuel tank 9, which is located close to the right side sill 3 to which the gusset 6 is attached, is protected from influences of deformation or the like due to the load transmitted.

The stiffener 8, which has a substantially L-shaped cross section as shown in FIG. 9, is joined to the inner surfaces of the bottom wall portion 4a and the rear wall portion 4c of the cross member 4 via a plurality of joint points over the entire length of the stiffener 8.

Thus, the stiffener 8 is integrated with the cross member 4 to efficiently improve the rigidity of the cross member 4 in the vehicle front-rear direction and the rigidity of the cross member 4 in the vehicle width direction.

The gusset 6 is joined via the joint points 15b to the cross member 4 at a portion thereof reinforced by the stiffener 8 (see FIG. 9) located inside the cross member 4. Thus, even when a load inputted by a side collision is transmitted from the gusset 6 to the cross member 4, the inputted load is effectively received by that portion to distribute the load over the entire vehicle body 1, while inhibiting deformation of the cross member 4.

As understood from the above description, the vehicle body floor structure according to the present invention is able to reliably receive and distribute a load inputted to the right side sill 3 by a side collision. With this structure, even when the fuel tank 9 is disposed close to the right side sill 3, to which the gusset 6 is attached, influences to the fuel tank 9 due to the deformation of the side sill 3 are reduced. That means, the structure improves the degree of freedom in arranging the fuel tank 9 and other members on the underside of the floor panel 2.

The present invention is not limited to the above-described embodiment, and various modifications are possible. The above-described embodiment is exemplified to describe the present invention in an easily understandable manner, and the present invention is not limited to those including all the described components. In addition, a part of the configuration of a certain embodiment may be replaced with apart of the configuration of another embodiment, and the configuration of a certain embodiment may be added with a configuration of another embodiment. Further, a part of the configuration in each of the embodiments may be removed, added or replaced with other configuration. Examples of modifications possible to the above-described embodiment include the following.

The vehicle body floor structure of the present embodiment has been described as including a gusset as the first reinforcing member. The configuration of the first reinforcing member is not limited to the gusset described above. For example, the first reinforcing member is not particularly limited as to its shape, number, and material, as long as it is arranged at an internal corner and joined to a side sill and to a cross member. For example, the first reinforcing member can be a bridge-like member.

The floor structure has been exemplified as one in which one gusset 6 is arranged at the internal corner 5 where the right side sill 3 and the cross member 4 are connected to each other, but floor structure is not particularly limited thereto. For example, the gusset 6 may be arranged at an internal corner where the left side sill 3 and the cross member 4 are connected to each other, or one gusset or a plurality of gussets may be arranged in each of the left and right internal corners.

The gusset 6 has been described as having a weak portion defined by the narrow portion 15*d* defined by the V-shaped notch 15*c* formed in the lower edge side of the oblique wall portion 6*a*, on the side of the joint surface 15*a* of the left end portion 15 of the gusset 6. However, the gusset 6 is not particularly limited thereto.

For example, the weak portion may be defined by a U-shaped notch 15*c* or a W-shaped notch 15*c*. Moreover, the weak portion may be formed by cutting out the upper edge side, or both the upper and lower edge sides, of the oblique wall portion 6*a*.

In the present embodiment, the second reinforcing member has been described as the bulkhead 7 attached to the joint portion 14 of the cross member 4, but the second reinforcing member is not limited thereto. For example, the second reinforcing member may be a member having a 90-degree rotated, U-shaped cross section and fitted into/over the inner/outer side of the cross member 4. That is, the second reinforcing member is not particularly limited as to its shape, number, and material as long as it is arranged at the joint portion 14 to which the gusset 6 is joined, to improve the rigidity of the cross member 4.

The gusset 6 has been described as having the bead 17 thereon. The configuration of the bead 17 formed on the gusset 6 is not limited to that described above. For example, two or more beads 17 may be formed on the gusset 6, and the bead 17 may be formed not to extend past the notch 15*c* toward the center C in the vehicle width direction. That is, the bead 17 is not particularly limited to the present embodiment, as to its shape, number, and material.

The stiffener 8 has been described as being disposed inside the cross member 4 to reinforce the cross member 4, but it is not limited thereto. The stiffener 8 may have different configuration as long as it covers the whole width dimension W3 of the fuel tank 9 in the vehicle width direction in plan view. For example, the stiffener 8 may extend over the entire width W2 of the cross member 4, and/or the stiffener 8 may be disposed on the outer side of the cross member 4. The location, shape, number, material and the like of the stiffener 8 is not particularly limited to those of the one in the present embodiment.

The vehicle body floor structure has been exemplified as one in which the gusset 6 and the stiffener 8 are together joined to the cross member 4 at the plurality of joint points 15*b* in an overlapping manner, but the vehicle body floor structure is not particularly limited thereto. For example, the gusset 6 may not be joined together with the stiffener 8. The number of joint points 15*b* may be one, or three or more.

The invention claimed is:

1. A vehicle body floor structure comprising:
a floor panel having a side edge;
a side sill joined to the side edge of the floor panel;
a cross member connected to the side sill, the cross member extending in a direction that crosses a direction in which the side sill extends;
a first reinforcing member disposed at an internal corner defined by the side sill and the cross member, the first reinforcing member joined to the side sill and to a joint portion of the cross member; and
a second reinforcing member disposed at the joint portion of the cross member,
wherein the first reinforcing member has an end portion located on a side of the joint portion and having a weak portion,
wherein the first reinforcing member has a bead that extends in a vehicle width direction, and
wherein the bead extends further than the weak portion inward in the vehicle width direction.

2. The vehicle body floor structure of claim 1,
wherein the second reinforcing member is a bulkhead attached in the cross member.

3. The vehicle body floor structure of claim 1,
wherein the weak portion is a V-shaped notch.

4. The vehicle body floor structure of claim 1, further comprising:
a fuel tank disposed close to the side sill to which the first reinforcing member is joined; and
a third reinforcing member disposed on the cross member along a longitudinal direction thereof from one end portion of the cross member toward another end portion thereof,
wherein an end portion of the third reinforcing member located on a side of the another end portion of the cross member extends past a center of the cross member in the vehicle width direction, and
wherein the third reinforcing member has a length along the longitudinal direction of the cross member smaller than a length from the one end portion of the cross member to the another end portion of the cross member.

5. The vehicle body floor structure of claim 4,
wherein the cross member, the first reinforcing member, and the third reinforcing member are joined together in an overlapping manner at at least one joint point.

6. A vehicle body floor structure comprising:
a floor panel having a side edge;
a side sill joined to the side edge of the floor panel;
a cross member connected to the side sill, the cross member extending in a direction that crosses a direction in which the side sill extends;
a first reinforcing member disposed at an internal corner defined by the side sill and the cross member, the first reinforcing member joined to the side sill and to the cross member; and
a second reinforcing member disposed inside the cross member,
wherein the first reinforcing member has a vehicle width direction inner end portion at which a weak portion is formed, and
wherein the second reinforcing member is located at a position such that the second reinforcing member and the weak portion are overlapped as viewed in a vehicle front-rear direction.

7. The vehicle body floor structure of claim 6,
wherein the second reinforcing member is a bulkhead attached in the cross member.

8. The vehicle body floor structure of claim 6,
wherein the weak portion is a V-shaped notch.

9. The vehicle body floor structure of claim 6,
wherein the first reinforcing member has a bead that extends in a vehicle width direction, and
wherein the bead extends further than the weak portion inward in the vehicle width direction.

10. The vehicle body floor structure of claim 6, further comprising:
a fuel tank disposed close to the side sill to which the first reinforcing member is joined; and
a third reinforcing member disposed on the cross member along a longitudinal direction thereof from one end portion of the cross member toward another end portion thereof,
wherein an end portion of the third reinforcing member located on a side of the another end portion of the cross member extends past a center of the cross member in the vehicle width direction, and
wherein the third reinforcing member has a length along the longitudinal direction of the cross member smaller than a length from the one end portion of the cross member to the another end portion of the cross member.

11. The vehicle body floor structure of claim 10,
wherein the cross member, the first reinforcing member, and the third reinforcing member are joined together in an overlapping manner at at least one joint point.

* * * * *